United States Patent [19]
Mohr

[11] 3,966,508
[45] June 29, 1976

[54] TREATING WASTE DISCHARGE LIQUIDS FROM METAL HARDENING BATHS, PARTICULARLY CONTAINING NITRITE AND NITRATE COMPOUNDS

[76] Inventor: Ekkehard Mohr, Kleinheppacher Weg 10, 7050 Waiblingen, Germany

[22] Filed: Aug. 6, 1974

[21] Appl. No.: 495,193

[30] Foreign Application Priority Data
Aug. 9, 1973 Germany............................ 2340405

[52] U.S. Cl................................. 148/15; 148/18; 148/20; 148/27; 252/71
[51] Int. Cl.² ........................................... C21D 1/48
[58] Field of Search................... 23/274, 272, 287; 148/27, 28, 15, 18, 20; 252/71

[56] References Cited
UNITED STATES PATENTS
| | | | |
|---|---|---|---|
| 2,375,758 | 5/1945 | Bates | 148/28 |
| 3,645,802 | 2/1972 | Keough | 148/15 |
| 3,793,208 | 2/1974 | Foreman | 148/15 |

*Primary Examiner*—Walter R. Satterfield
*Attorney, Agent, or Firm*—Flynn and Frishauf

[57] ABSTRACT

To improve recovery of nitrate-nitrite compounds from effluent of nitriding processes, a melt of the nitrate-nitrite salts is prepared and maintained at a temperature above about 400° C; the effluent liquid is introduced into the melt, to evaporate the water and melt the salts contained therein to merge immediately into the melt, the melt being drawn off by an overflow. The evaporated water is filtered to recover any remaining salts, together with condensation water. Preferably, the apparatus includes a dispersion device close to the introduction duct of the effluent liquid into the melt, to prevent introduction of the effluent liquid in a solid stream; this dispersion may be an open pot with a perforated bottom located beneath the surface of the melt, a cartridge with steel wool, or the like.

5 Claims, 3 Drawing Figures

TREATING WASTE DISCHARGE LIQUIDS FROM METAL HARDENING BATHS, PARTICULARLY CONTAINING NITRITE AND NITRATE COMPOUNDS

The present invention relates to the treatment of effluent liquid from hardening baths, and more particularly to the treatment of used baths from nitriding processes which forms rinse water in which hardened work pieces have been rinsed.

It has previously been proposed to treat effluent liquid, containing nitrate-nitrite mixtures by evaporation, and to recover the nitrate-nitrite compounds contained therein (see, for example, German Disclosure Document DT-OS No. 1,696,131). The effluent liquid is introduced in an evaporating boiler for such a time that the watery liquid, or brine, changes, without visible transition, from brine to a salt melt. The salt melt is then heated to a temperature of between about 140° to 350° C. The minor proportion of cyanide compounds are oxidized in this process in the nitrate-nitrite mixture. The temperature range causes separation of low-melting and high-melting salts, and the low-melting nitrite-nitrate mixture can be drawn off and reused.

The evaporation-melting process, above referred to, has the advantage tht it is no longer necessary to introduce detoxified effluent from hardening installations into water treatment plants, or into public waterways; these effluents still contain salts. Additionally, the danger is avoided that breakdown in the detoxification systems might occur so that effluent liquid is actually introduced into water treatment plants, or into public waters, since the boiling off and recovery process no longer results in water being directly discharged after the treatment process. An additional advantage is obtained in that the salts in the effluent waters can be largely recovered. The heat necessary for evaporation can usually be derived from the exhaust gases of the treatment furnaces for the work pieces themselves. The efficiency of the known process is enhanced since the salts used in the hardening processes are highly water-soluble, so that the rinse waters being used, and discharged, usually already have a high concentration of salts. Since no detoxification chemicals need be used, substantial cost savings can result.

It is an object of the present invention to improve the general process aforementioned by eliminating the boiling-off step. It has been found that, if the heat is intense, boil-over may result. If the effluent liquid, that is, the rinse water, is highly contaminated, excessive foaming may occur. Drawing off the nitrite-nitrate mixtures, after terminating the evaporation step, is a non-continuous process which introduces loss in time, plant utilization, and efficiency.

SUBJECT MATTER OF THE PRESENT INVENTION

Briefly, the effluent liquid is introduced into the melt, typically a nitrite-nitrate mixture, at a temperature of over about 400° C, in controlled quantity, so that the water of the introduced liquid evaporates and that the salts contained in the effluent liquid merge into the melt. The salts of the melt can then be removed by an overflow.

In contrast to the known method, the present invention permits a continuous process, that is, a continuous evaporation of the effluent waters from hardening installations, without boiling over, or foaming, and operating at higher energy level. An evaporation furnace of given size may, therefore, provide about five times, or more, the output as the furnace operated in accordance with the method of the prior art. The labor, and maintenance requirements are also substantially less.

The invention will be described by way of example with reference to the accompanying drawings which illustrate apparatus to carry out the method in accordance with the present invention, and wherein.

Figures 2, 3:
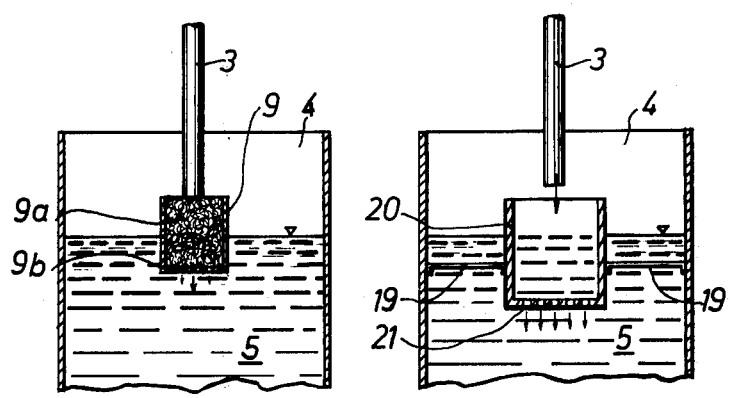
FIG. 2 is a fragmentary schematic sectional view of the end of a liquid introduction tube, or pipe, for the effluent liquid leading the liquid into an evaporation boiler, and showing one embodiment of dispersion device.
FIG. 3 is a longitudinal fragmentary axial view similar to FIG. 2, showing another embodiment of a dispersion device, in fluid communication with an effluent pipe.

Rinse liquid, or other effluent to be discarded from hardening processes, generally illustrated at 2, is contained in a vessel 1, and conducted by means of piping 3 to an evaporating boiler vessel 4. Pumps, and the like, have not been shown; alternatively, gravity feed can be used. Different levels of liquid necessary for gravity feed have, likewise, been omitted from the schematic representation for simplicity of the drawing. The effluent 2, pumped through pipe 3, reaches the evaporation boiler vessel 4 in which a melt of nitrite-nitrate compounds is contained. The melt 5 in vessel 4 is maintained at a temperature of about over 400° C, preferably about 500° C. The boiler 4 is located in an evaporation furnace 6. An opening 7 in the furnace permits introduction of heat energy, for example by means of a burner 8, which may be an oil burner, a gas burner, or other heat source. The effluent liquid 2, conducted through pipe 3, is finely dispersed by a terminal pipe 9 dipped into the melt 5. Pipe 9 is filled with balled, preferably loosely balled steel wool, in a cartridge, or bulb end connected to the pipe 3, and formed with a sieve, or mesh bottom 9b (FIG. 2). The aqueous content of the liquid conducted through pipe 3 immediately evaporates upon being introduced into the melt. The salt components within the effluent liquid, however, merge into, or are absorbed in the melt. The minor proportions of poisonous cyanides contained in the effluent liquid are oxidized. The liquid level of the salt melt 5 rises as additional effluent, containing salts, is introduced. Eventually, the liquid level will reach an overflow level, or edge of an overflow duct 10, so that overflowing liquid can be conducted into a catch basin, or trough 11, in which the salt solidifies. The salts can then be re-used, and re-cycled.

A vapor catch hood 12 is located above the overflow 10. A ventilator 13 removes steam and vapor from the overflow 10 by means of suction. The vapor, or steam removed by the ventilator is introduced, under overpressure, into a filter housing 14, to pass through a filter 15, from whence the vapor, or steam can be conducted to ambient air through a duct 16. The only substance being discharged into ambient air, then, is water vapor.

Figure 1:
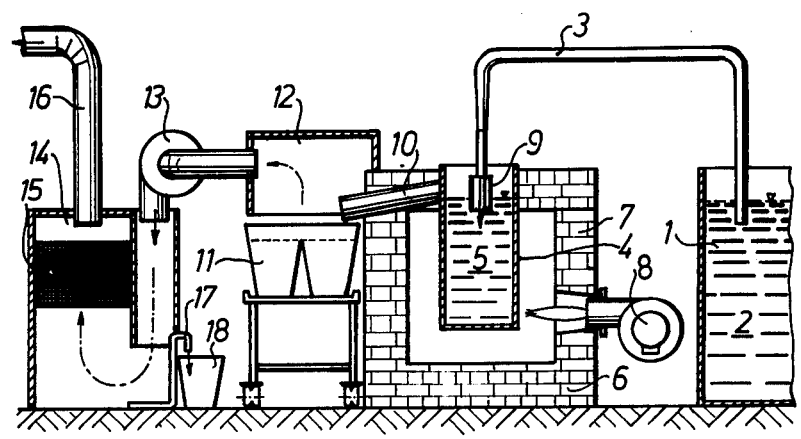
FIG. 1 is a highly schematic representation, in front view, of an effluent treatment installation.

Any remaining salt particles are trapped in the filter 15, so that the steam and vapor, being passed through the filter 15 are completely cleansed thereby. Remaining salt remnants, caught in the filter 15, may drip off the filter together with condensate, to be caught in a catch pan, and conducted by means of a draw-off tube 17 into a condensate vessel 18. Necessary pumps, or gravity differentials have, again, been omitted from the showing of FIG. 1 for simplicity. The contents of the vessel 18 may be reintroduced into pipe 3, and then into the melt 5, by means of a separate introduction inlet, not shown, or otherwise treated.

If the effluent liquid were directly applied to the surface of the salt melt 5 which, as noted, is heated preferably to about 500° C, then immediate evaporation would result of the effluent liquid, under substantial bubble, and spray conditions. A substantial portion of the salts within the effluent water would be dispersed into a fine spray thereby, together with water vapor. This undesirable result is avoided by conducting the effluent liquid directly into the melt. As shown in FIG. 2, the effluent liquid is dispersed upon introduction into the melt by the special terminal bulb 9, located at least in part within the melt and containing the balled steel wool 9a, so that the liquid through pipe 3 is finely dispersed. The sieve or mesh 9b at the terminal end of the pipe 9 further contributes to fine dispersion of the liquid 2 being introduced through pipe 3 and bulb 9. Sieve or mesh 9b simultaneously acts as a holding or retaining bottom for the steel wool 9a. It is not necessary that the effluent water is introduced into the melt 5 in an entirely enclosed bulb or vessel. Referring to FIG. 3, a catch trough 20 is suspended by means of a spider 19 within the boiler vessel 4. The catch trough 20 has a perforated bottom wall or surface 21, located beneath the top level of the melt 5. Effluent water is conducted, freely, into the catch trough 20. The level of the melt within the trough 20 will be at the same height as the level of the melt outside the trough 20, within the vessel 4. Trough or pot 20 is so arranged that liquid from pipe 3 is applied to the surface of the melt within the trough 20. The side edges of the trough 20 are above the liquid level. The proportion of melt within the trough 20 with respect to the melt outside of the trough 20 is comparatively small and, thus, the melt within trough 20 rapidly cools under the action of the liquid introduced from pipe 3. Thus, the liquid from pipe 3 can be introduced into the pipe 20 without bubbling or boiling off immediately at the surface upon contact with the melt in trough 20. The melt 5 may, however, accept the salt within the trough 20, dispersed through the open bottom 21, so that the salts within the effluent liquid are not fragmentized or atomized at the surface thereof.

Various changes and modifications may be made within the scope of the inventive concept.

I claim:

1. Method of continuously treating waste discharge aqueous liquid from baths of industrial cyanide-containing hardening or treating salts, by evaporation of liquid and detoxification of the cyanide portions by oxydation comprising preparing a melt of the salts comprising a nitrate-nitrite mixture at a temperature of about at least 400°C;

introducing the discharge liquid into the melt in controlled amounts insufficient to lower the temperature of the melt in the immediate vicinity of the introduction location to below evaporation temperature of the water to effect essentially immediate evaporation of the water content of the discharge liquid and to introduce the salts in the discharge liquid into the melt;

permitting the melt to overflow an overflow level; and recovering the overflowing melt.

2. Method according to claim 1, wherein the step of introducing the liquid into the melt comprises finely dispersing the liquid as it is being introduced into the melt.

3. Method according to claim 1, further comprising the steps of recovering water vapor from the melt;

filtering the water vapor;

and recovering the filtered salt remnants together with vapor condensate.

4. Method according to claim 1, wherein the step of introducing the liquid into the melt comprises introducing the discharge liquid into the melt below the surface thereof.

5. Method according to claim 1, wherein the step of introducing the liquid into the melt comprises confining the melt in a vessel;

segregating a zone of low melt concentration within the vessel and in fluid communication with the melt;

and introducing the discharge liquid into said segregated zone.

* * * * *